US012753052B2

(12) United States Patent
Bren et al.

(10) Patent No.: US 12,753,052 B2
(45) Date of Patent: Oct. 6, 2026

(54) COW—WIRE SPOOLER

(71) Applicant: DISH Wireless L.L.C., Littleton, CO (US)

(72) Inventors: Bryan Lee Bren, Highlands Ranch, CO (US); James Richard Sanders, Jr., Suwannee, FL (US); Erik Wayne Madson, Englewood, CO (US)

(73) Assignee: DISH Wireless L.L.C., Littleton, CO (US)

( * ) Notice: Subject to any disclaimer, the term of this patent is extended or adjusted under 35 U.S.C. 154(b) by 49 days.

(21) Appl. No.: 18/520,163

(22) Filed: Nov. 27, 2023

(65) Prior Publication Data

US 2025/0171280 A1 May 29, 2025

(51) Int. Cl.
*B66D 1/38* (2006.01)

(52) U.S. Cl.
CPC ........ *B66D 1/38* (2013.01); *B66D 2700/0191* (2013.01)

(58) Field of Classification Search
CPC ...... B65H 75/4486; B65H 75/28; B66D 1/38; B66D 2700/0191
USPC .................................. 242/390, 390.8, 390.9
See application file for complete search history.

(56) References Cited

U.S. PATENT DOCUMENTS 1,259,162 A * 3/1918 Sundh .................... B65H 19/28 242/532.5
1,262,135 A * 4/1918 Sundh .................... B65H 19/28 242/532.5
2,225,180 A * 12/1940 Olesen ................... B65H 54/58 242/125.1
3,113,742 A * 12/1963 Bevan ..................... H04L 13/06 242/546
3,926,383 A * 12/1975 McConnell ............ B65H 75/36 242/402
4,099,682 A * 7/1978 Benuska ............ B65H 19/2292 242/532.6
4,161,298 A * 7/1979 Davis ................... B65H 54/585 242/532.6
4,513,772 A * 4/1985 Fisher ................ B65H 75/4407 192/114 R
4,632,329 A * 12/1986 Burley ................... B65H 75/28 242/390.8
4,753,399 A * 6/1988 Baum ....................... B66D 1/30 254/DIG. 14
5,522,582 A * 6/1996 Dilks ........................ B66D 1/40 254/323
(Continued)

*Primary Examiner* — William A. Rivera
(74) *Attorney, Agent, or Firm* — Kilpatrick Townsend & Stockton LLP

(57) ABSTRACT

A spooler includes an engine within a housing, an arm extending from the housing and rotated via the engine, a barrel supported by the arm such that the barrel rotates with the arm, the barrel having a first end and a second end facing the housing, and a first retention mechanism disposed along a perimeter of the barrel. A spooler system includes a woundable material having a first end and a second end and a spooler. The spooler includes a battery operated engine within a housing, an arm extending from the housing and rotated via the engine, a barrel supported by the arm such that the barrel rotates with the arm, a first retention mechanism that removably secures the first end of a woundable material to the barrel, and a mounting mechanism for mounting the spooler to a vehicle.

13 Claims, 8 Drawing Sheets

(56) References Cited

U.S. PATENT DOCUMENTS

| | | | | |
|---|---|---|---|---|
| 6,672,329 | B1 * | 1/2004 | Brooks | B65H 75/4471 242/390.8 |
| 8,336,800 | B1 * | 12/2012 | Lopez | B65H 75/4407 137/355.27 |
| 2004/0231723 | A1 * | 11/2004 | Harrington | A01G 25/162 137/355.2 |
| 2015/0266698 | A1 * | 9/2015 | Holverson | B65H 75/4481 242/389 |
| 2017/0259941 | A1 * | 9/2017 | Briggs, IV | B66D 1/505 |
| 2019/0023520 | A1 * | 1/2019 | Robertson | B65H 59/04 |
| 2019/0237957 | A1 * | 8/2019 | Kiely | H02G 11/02 |
| 2021/0130144 | A1 * | 5/2021 | Haley | B66D 1/14 |
| 2025/0010737 | A1 * | 1/2025 | Holmström | B65H 75/425 |

* cited by examiner

COW—WIRE SPOOLER

BACKGROUND OF THE INVENTION

Various woundable materials may be challenging to properly spool for installation and storage. The stiffness, weight, elasticity, texture, etc., of a material may complicate or otherwise increase the laboriousness of spooling the material.

BRIEF SUMMARY OF THE INVENTION

According to various embodiments described herein, a spooler is provided that spools a woundable material. According to one embodiment, a spooler includes an engine within a housing, an arm extending from the housing and rotated via the engine, a barrel supported by the arm such that the barrel rotates with the arm, the barrel having a first end and a second end facing the housing, and a first retention mechanism disposed along a perimeter of the barrel. The spooler may include various optional embodiments. The first retention mechanism may removably secure a first end of a woundable material to the barrel. The woundable material may be coaxial cable. The spooler may include a guiding element for maintaining the woundable material around the barrel. The guiding element may be removable from the barrel. The spooler may include a second retention mechanism disposed along the perimeter of the barrel. The second retention mechanism may secure a second end of the woundable material to the barrel. The arm and the barrel may be rotated a first direction for winding and a second direction for unwinding. The housing may include a counterbalance weight such that the spooler maintains an upright position during the rotation. The spooler may further include a mounting mechanism for mounting the spooler to a vehicle. The spooler may further include a speed regulation mechanism for adjusting a rate of the rotation. The engine may be battery operated.

According to another embodiment, a spooler system includes a woundable material having a first end and a second end and a spooler. The spooler includes a battery operated engine within a housing, an arm extending from the housing and rotated via the engine, a barrel supported by the arm such that the barrel rotates with the arm, a first retention mechanism that removably secures the first end of a woundable material to the barrel, and a mounting mechanism for mounting the spooler to a vehicle. The system may include various optional embodiments. The system may include a speed regulation mechanism for adjusting a rate of the rotation. The system may include an emergency stop mechanism. The woundable material may be coaxial cable. The system may include a guiding element for maintaining the woundable material around the barrel. The guiding element may be removable from the barrel. The arm and the barrel may be rotated a first direction for winding and a second direction for unwinding. The housing may include a counterbalance weight such that the spooler maintains an upright position during the rotation.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The present disclosure generally relates to a spooler that spools a woundable material and in particular spools coaxial piping for temporary installation and storage of portable cell towers, although various applications for such a spooler are contemplated. Portable cell towers may be temporarily installed in areas for providing interim cell phone reception and the like. For example, portable cell towers may be used in disaster relief deployment when existing structures have fallen or are otherwise non-functional due to weather, conflict, or other disaster events. Portable cell towers are transported to their end use location with coaxial cables for wiring through the portable cell towers to provide power, data, or the like to the portable cell towers as would be appreciated by one having ordinary skill in the art. The coaxial cables are relatively stiff and heavy, thereby making the coaxial cables difficult to wind up after use and to unwind for wiring the portable cell towers. Importantly, an operator must take care to avoid bending the coaxial cables during the winding. Furthermore, the cables must be carefully placed onto the ground or other surface that would damage the coaxial cables and render them inoperative. Accordingly, embodiments of the present disclosure provide a spooler mechanism that shortens the time and improves the efficiency of winding and unwinding various woundable materials.

Figure 1A:
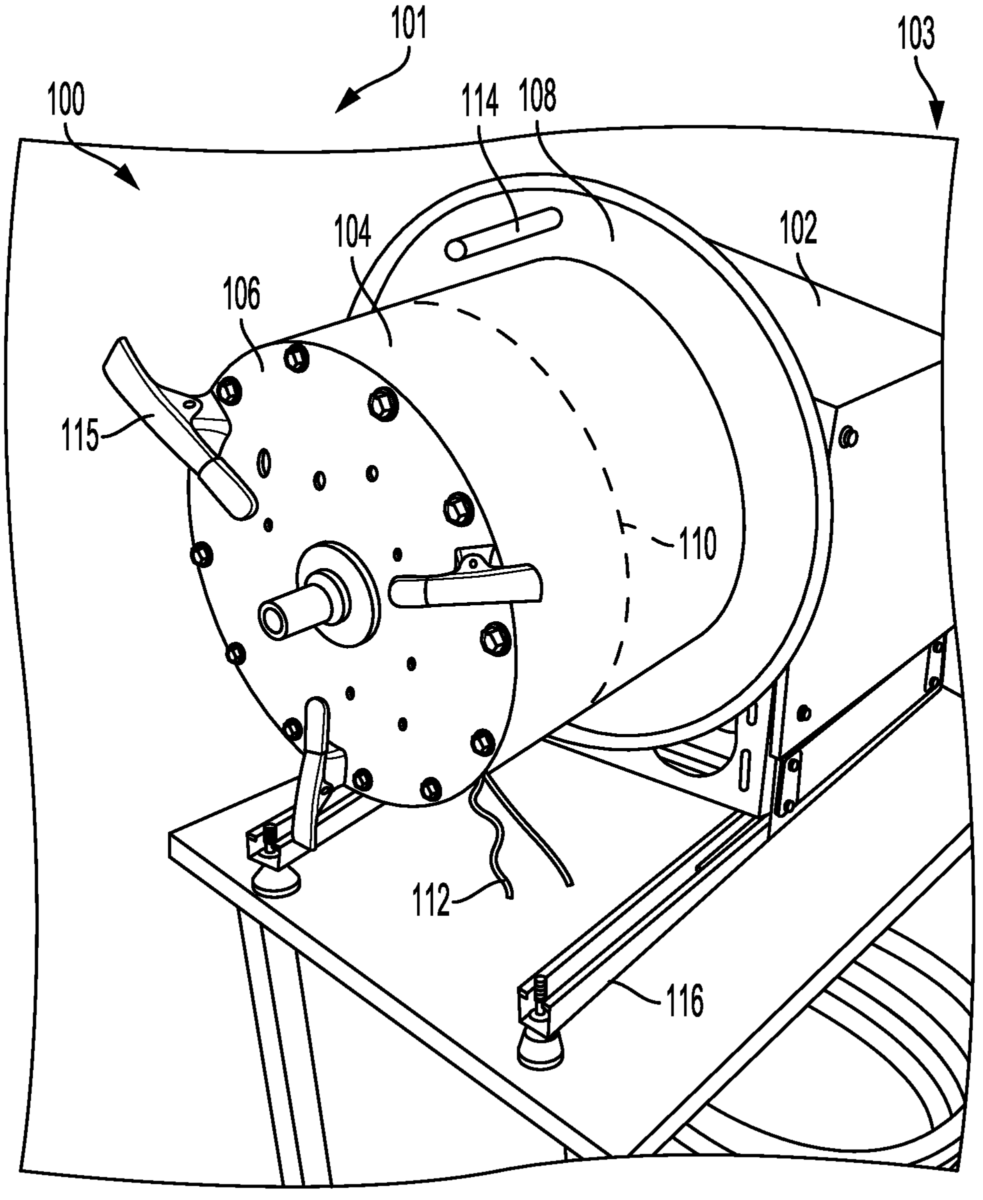
FIG. 1A illustrates a first perspective view of a first spooler, in accordance with one embodiment of the present disclosure.

FIG. 1A illustrates a first perspective view of a first spooler. A spooler 100 as described throughout the present disclosure is described with respect to spooling coaxial cables or the like. It should be appreciated by one having ordinary skill in the art upon reading the present disclosure that a spooler 100 as described throughout the present disclosure may be used to spool a variety of woundable materials including, but not limited to, rope, chain, wire, piping, cables, ethernet, etc. The spooler 100 includes an engine (not shown) within a housing 102. The housing 102 may be a box or other storage receptacle for components of the engine that runs the spooler 100. For example, the housing 102 may include a removable top cover and/or side panel(s) for accessing various components of the engine for adjusting the speed of rotation, the direction of rotation, the brakes, etc., of the spooler 100.

According to various embodiments, the housing 102, in particular the engine, may include a speed regulation mechanism (not shown) for adjusting a rate of the rotation. The housing 102 may further include an emergency stop mechanism (not shown) for braking the barrel 104 rotation as would be appreciated by one having ordinary skill in the art in view of the present disclosure. The speed regulation mechanism and the emergency stop mechanism will be described in further detail below with respect to other figures. The spooler 100 may further include a power on/off switch, button, lever, or the like for operating the spooler 100.

In various embodiments, the spooler 100 includes an arm (not shown) extending from the housing 102. The arm is rotated via the engine in a manner which would become apparent to one having ordinary skill in the art upon reading the present disclosure. For example, the engine may be an electrical or battery operated engine that operates a series of cranks or the like for rotating the arm a first direction for winding and a second direction for unwinding. An operator may adjust the speed of rotation and/or the direction of rotation by actuating various components of the engine. According to at least some embodiments, the arm, and the barrel 104 are rotated a first direction 101 for winding and a second direction 103 for unwinding or vice versa.

According to various embodiments, a barrel 104 is supported by the arm such that the barrel 104 rotates with the arm. The barrel 104 includes a first end 106 and a second end 108 facing the housing 102. For example, the first end 106 and the second end 108 may be substantially flat ends having any shape and the second end 108 is planar surface relative to a side surface of the housing 102. In at least some embodiments, the circumference of the first end 106 and the circumference of the second end 108 are different, as shown in FIG. 1A, such that the woundable material may be slid off of the barrel 104 after the woundable material is wound by the spooler 100. In the foregoing embodiment, the circumference of the first end 106 is the same as the circumference of the barrel 104. In other embodiments, the circumference of the first end 106 and the circumference of the second end 108 are the same. One or more of the first end 106 and the second end 108 may be removable after winding the woundable material, to be described in further detail below.

In at least some embodiments, the barrel 104 includes a perimeter 110 along the circumference of the barrel 104. The perimeter 110 may be along the circumference of the first end 106 or along the perimeter of the second end 108 according to some embodiments. A first retention mechanism 112 is disposed along the perimeter 110 of the barrel 104. A first retention mechanism 112 may be a tie, as shown in FIG. 1A, a clamp, a lock, or the like that removably secures a first end of a woundable material to the barrel 104. For example, the woundable material may be a length of coaxial cable having a first end and a second end. The coaxial cable may be wound after use for transport or unwound for installation. The first retention mechanism 112 may be used to secure a free end as the woundable material is wound on the barrel 104 as the barrel 104 rotates.

According to some embodiments, the spooler 100 further includes a guiding element 114 for maintaining the woundable material around the barrel. The guiding element 114 may be a bar or other guide for maintaining the woundable material close to the barrel 104 as the barrel 104 rotates. For example, in applications where the woundable material is particularly stiff, the woundable material may resist bending along the barrel 104 as the barrel 104 rotates, thereby reducing the efficiency of the spooler 100. The guiding element 114 may be removable from the barrel 104, according to at least some embodiments. As shown in FIG. 1A, an alternative guiding element 115 may be a movable clamp feature that retains the woundable material on the barrel 104 as the woundable material is wound. The alternative guiding element 115 as shown in FIG. 1A may be actuated by an operator from a first configuration (as shown) that retains the woundable material on the barrel 104, to a second configuration where the wound woundable material may be slid off of the barrel 104 of the spooler for storage, transport, installations, etc. One or more guiding elements 114 or alternative guiding elements 115 may be implemented in the spooler 100 to accommodate various woundable materials.

In at least some embodiments, the spooler 100 further includes a second retention mechanism (not shown) disposed along the perimeter 110 of the barrel 104. The second retention mechanism may be the same or different from the type of retention mechanism used for the first retention mechanism 112. The second retention may secure a second end of the woundable material to the barrel 104. For example, in some applications it may be desired to leave the wound woundable material on the barrel 104 and transport the woundable material on the barrel 104. The barrel 104 may be removable from the housing 102 and replaced with a new barrel as would be appreciated by one having ordinary skill in the art upon reading the present disclosure.

In some embodiments, the housing 102 includes a counterbalance weight (not shown) such that the spooler 100 maintains an upright position, as shown in FIG. 1A, during the rotation. The woundable material may be a relatively heavy material that exhibits a downward force on the barrel 104 and cause the spooler 100 to tip or otherwise fall. Accordingly, at least some embodiments of the spooler 100 described herein consider the effect of the weight of the woundable material to be wound and include a counterbalance weight within the housing to counteract any tendency for tipping.

In various embodiments, the spooler 100 includes a mounting mechanism 116 for mounting the spooler to a vehicle. For the foregoing reasons, a mounting mechanism 116 may be provided to further stabilize the spooler 100 when winding a relatively heavy woundable material. Furthermore, it may be desirable to transport the spooler 100 with the woundable material. Accordingly, the mounting mechanism 116 may securely and removably fasten the spooler 100 to a vehicle, trailer, cart, or other surface.

Figure 1B:
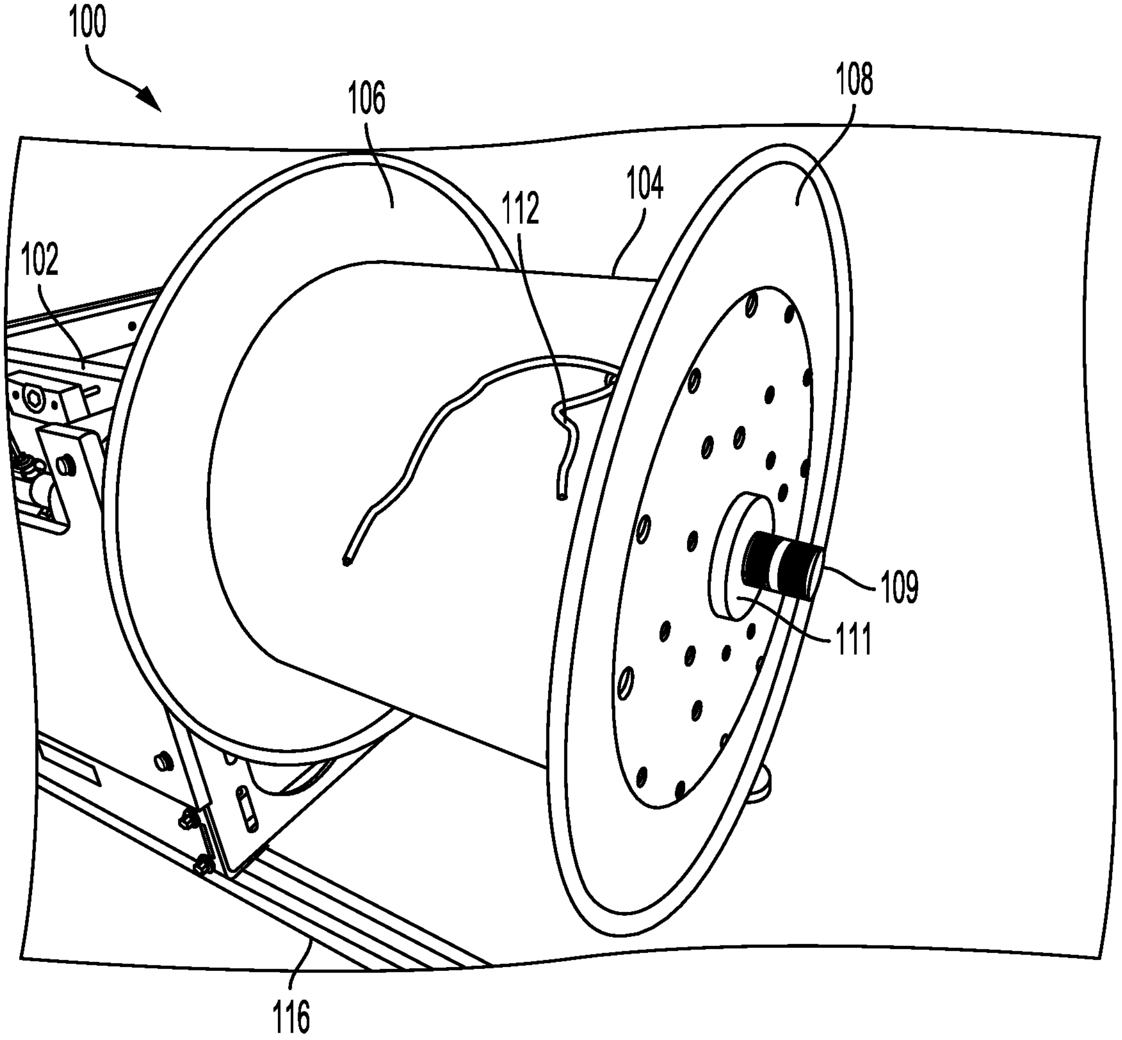
FIG. 1B illustrates a first perspective view of a second spooler, in accordance with one embodiment of the present disclosure.

FIG. 1B illustrates a first perspective view of a second spooler. The description of the spooler 100 with respect to FIG. 1A is applicable to the description of FIG. 1B and similar numbered components have similar form and function unless otherwise noted herein. As shown in FIG. 1B, the barrel 104 includes a first end 106 proximate to the housing 102 and a second end 108 distal from the housing 102. In this alternative embodiment, the second end 108 is removable after winding the woundable material and/or for unwinding wound woundable material. The second end 108 may be a separate piece from the barrel 104 that is secured to the barrel 104 using a collar 109 and a set screw 111 as shown in FIG. 1B. The collar 109 may extend from the arm (not shown) that extends through the barrel 104 and rotates with the barrel 104 or the collar 109 may be a separate component coupled to the barrel 104 in a manner that would be appreciated by one having ordinary skill in the art upon reading the present disclosure. In other embodiments, an alternative mechanism or combination of mechanisms may be used to removably secure the second end 108 to the barrel 104 for unloading the wounded woundable material or loading wounded woundable material to be unwound.

Figure 2:
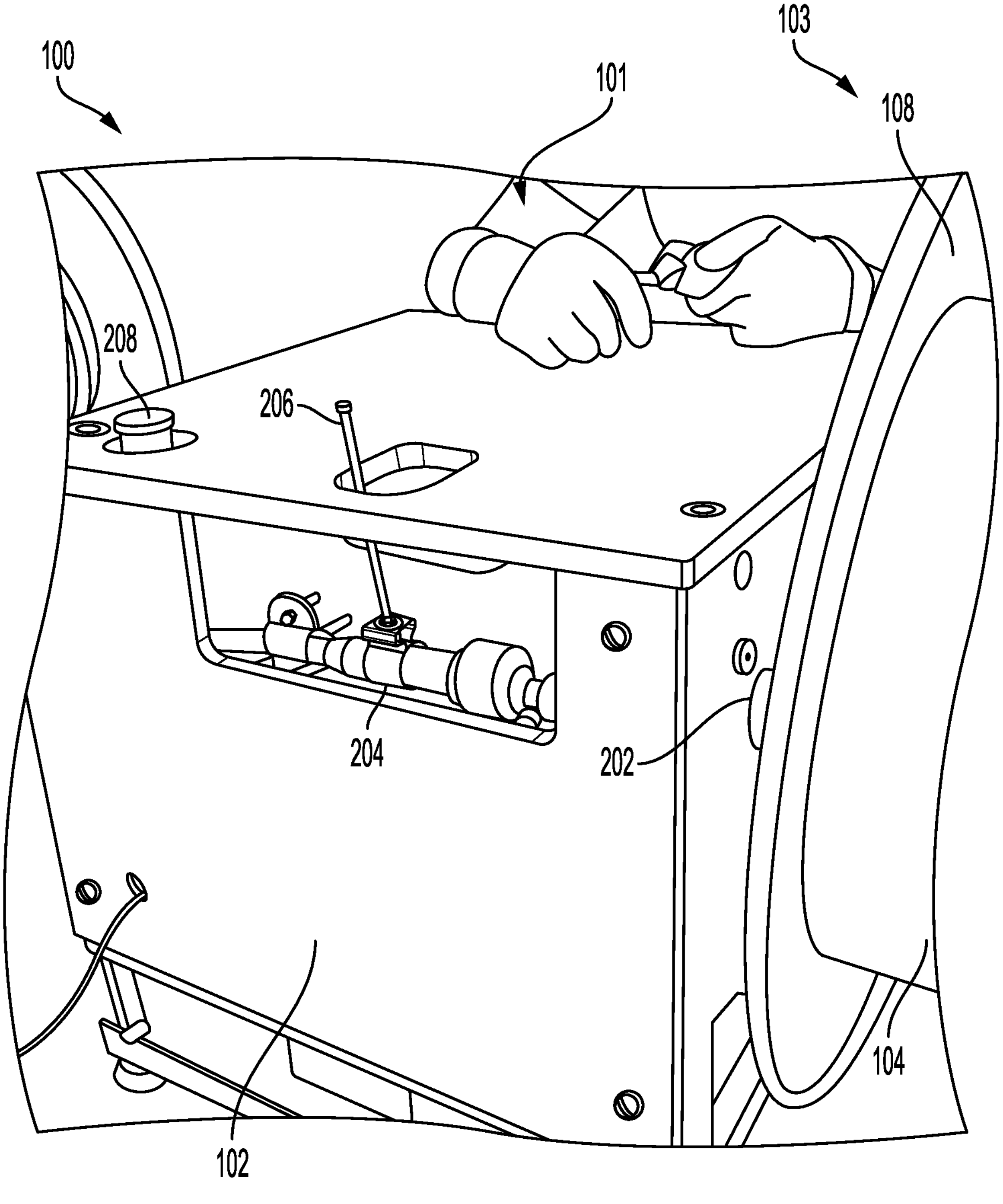
FIG. 2 illustrates a second perspective view of a spooler, in accordance with one embodiment of the present disclosure.

FIG. 2 illustrates a second perspective view of a spooler. The description of the spooler 100 with respect to FIGS. 1A-1B is applicable to the description of FIG. 2 and similar numbered components have similar form and function unless otherwise noted herein. Visible in this view, a spooler 100 includes an arm 202 extending from the housing 102. The arm 202 is rotated via an engine 204, partially visible in this view, in a manner which would become apparent to one having ordinary skill in the art upon reading the present disclosure. For example, the engine 204 may be an electrical or battery operated engine that operates a series of cranks or the like for rotating the arm 202 a first direction for winding and a second direction for unwinding. According to at least some embodiments, the arm 202 and the barrel 104 are rotated a first direction 101 for winding and a second direction 103 for unwinding or vice versa.

An operator may adjust the speed of rotation and/or the direction of rotation by actuating a speed regulation mechanism 206. The speed regulation mechanism 206 may be a lever as shown in FIG. 2 according to some embodiments. In other embodiments, the speed regulation mechanism 206 may be a dial, a pedal, a throttle, a handle, or the like. The speed regulation mechanism 206 may also serve as a power switch for the engine 204 (e.g., for the spooler 100) as would be appreciated by one having ordinary skill in the art. For example, the speed regulation mechanism 206 may be a lever, as shown in FIG. 2, and actuating the lever to the full extent in one direction may turn the spooler 100 off. In other embodiments, the lever may be actuated in another direction (e.g., other than forward or backward) to shift the spooler 100 into an off mode. Further, the spooler 100 may include an emergency stop mechanism 208 for braking the barrel 104 rotation. According to at least some embodiments, the speed regulation mechanism 206 and the emergency stop mechanism 208 may be a single component having different operating configurations. For example, a lever may be used as the speed regulation mechanism 206 and a button located on a distal end of the lever may be used as the emergency stop mechanism 208.

Figure 3:
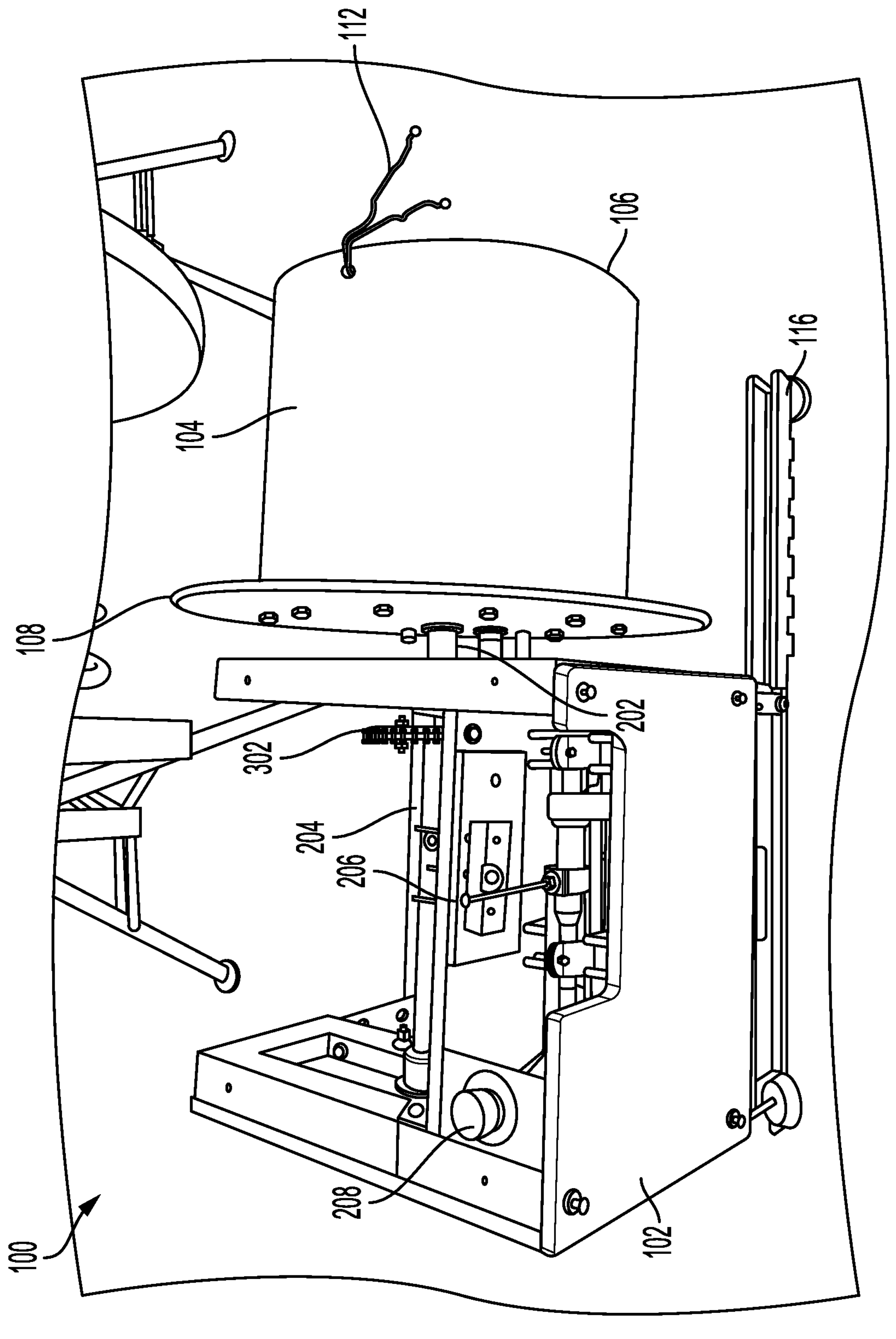
FIG. 3 illustrates a top perspective view of a spooler, in accordance with one embodiment of the present disclosure.

FIG. 3 illustrates a top perspective view of a spooler. The description of the spooler 100 with respect to FIGS. 1A-2 is applicable to the description of FIG. 3 and similar numbered components have similar form and function unless otherwise noted herein. A top cover of the housing 102 and various components are removed from this view for clarity. Visible in this view, a spooler 100 includes an arm 202 extending from the housing 102. The arm 202 is rotated via an engine 204 that operates a series of cranks 302 for rotating the arm 202 a first direction for winding and a second direction for unwinding. An operator may adjust the speed of rotation and/or the direction of rotation by actuating a speed regulation mechanism 206. The speed regulation mechanism 206 may also serve as a power switch for the engine 204 (e.g., for the spooler 100) as would be appreciated by one having ordinary skill in the art. Further, the spooler 100 may include an emergency stop mechanism 208 for braking the barrel 104 rotation.

According to various embodiments, the barrel 104 is supported by the arm such that the barrel 104 rotates with the arm. The barrel 104 includes a first end 106 and a second end 108 facing the housing 102. For example, the first end 106 and the second end 108 may be substantially flat ends having any shape and the second end 108 is planar surface relative to a side surface of the housing 102. In at least some embodiments, the circumference of the first end 106 and the circumference of the second end 108 are different, as shown in FIG. 2, such that the woundable material may be slid off of the barrel 104 after the woundable material is wound by the spooler 100. In the embodiment shown in FIG. 3, the circumference of the first end 106 is the same as the circumference of the barrel 104. In other embodiments, the circumference of the first end 106 and the circumference of the second end 108 are the same. One or more of the first end 106 and the second end 108 may be removable after winding the woundable material.

Figure 4:
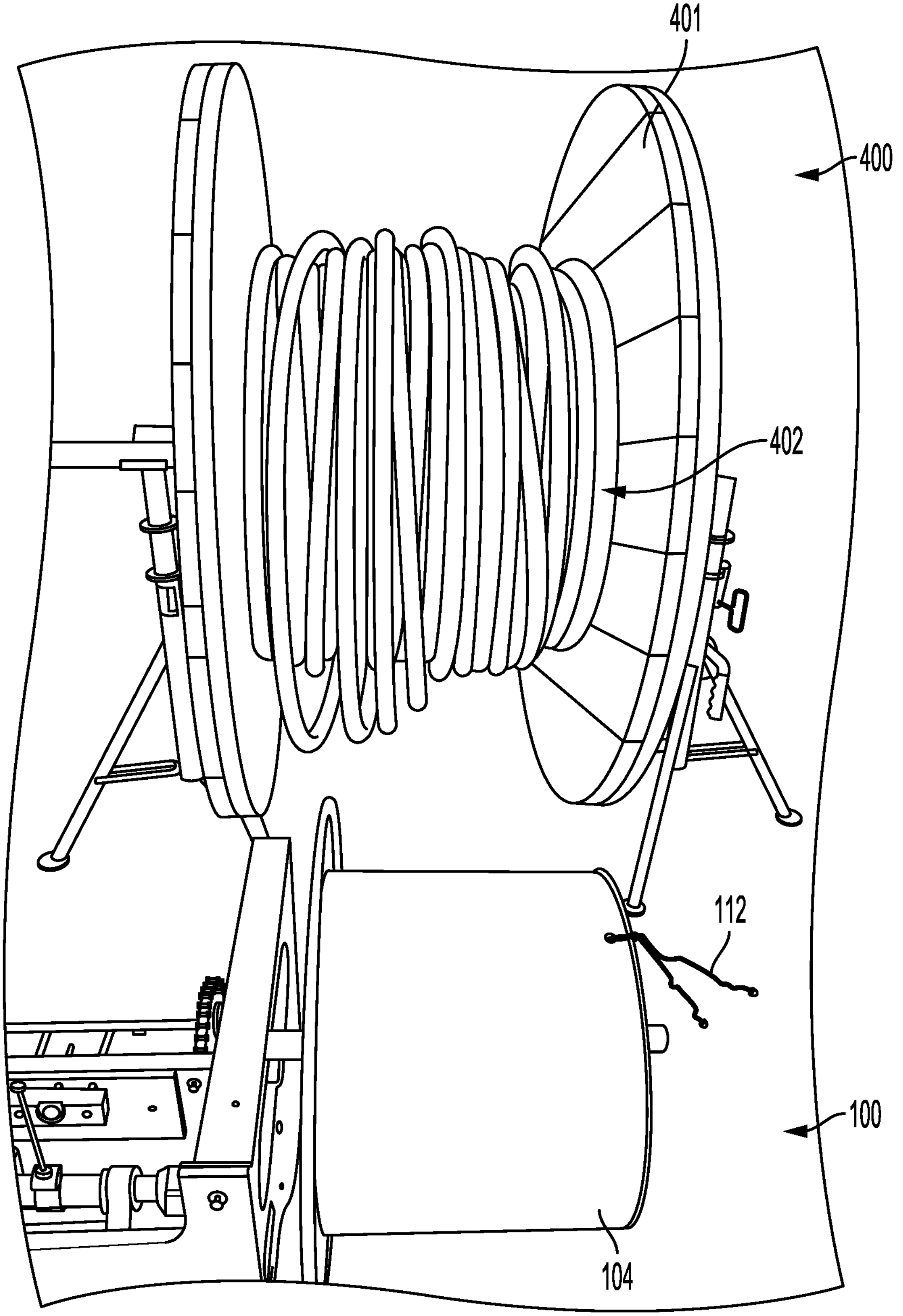
FIG. 4 illustrates a spooler system including a woundable material to be wound on a spooler, in accordance with one embodiment of the present disclosure.

FIG. 4 illustrates a spooler system including a woundable material to be wound on a spooler. The description of the spooler 100 with respect to FIGS. 1A-3 is applicable to the description of FIG. 4 and similar numbered components have similar form and function unless otherwise noted herein. Spooler system 400 includes a woundable material 402 to be wound on the spooler 100. According to at least some embodiments, the woundable material 402 may be rope, chain, wire, piping, cables, ethernet, etc.

In an exemplary embodiment, and as shown in FIG. 4, the woundable material 402 is coaxial cable. In particular, the coaxial cable may be used to provide power and/or data to temporary cell towers such as for providing reception in disaster relief areas. Due to the temporary nature of these cell towers, the coaxial cable must be transported to the installation site, unwound for installation, and rewound for transportation once the temporary cell tower is slated for removal from the site. Coaxial cable is relatively heavy and stiff compared to other woundable materials and the spooler 100 as described herein advantageously provides a mechanism for winding and unwinding the coaxial cable, especially for use with temporary cell towers.

In some embodiments, and as shown in FIG. 4, the woundable material 402 may be provided in bulk on reel 401 and a length of the woundable material 402 may be wound on the spooler 100. The spooler 100 as described herein advantageously increases the efficiency of processing bulk woundable material 402 into usable lengths of the woundable material 402 with minimal waste and cutting. Each length of woundable material 402 may be wound into a coil using the spooler 100 and cut from the reel 401 as would be appreciated by one having ordinary skill in the art upon reading the present disclosure. In other embodiments, the woundable material 402 is pre-cut into usable lengths and each length of woundable material 402 is wound and unwound as desired for use, for example, as needed for installation of temporary cell towers or the like.

Figure 5:
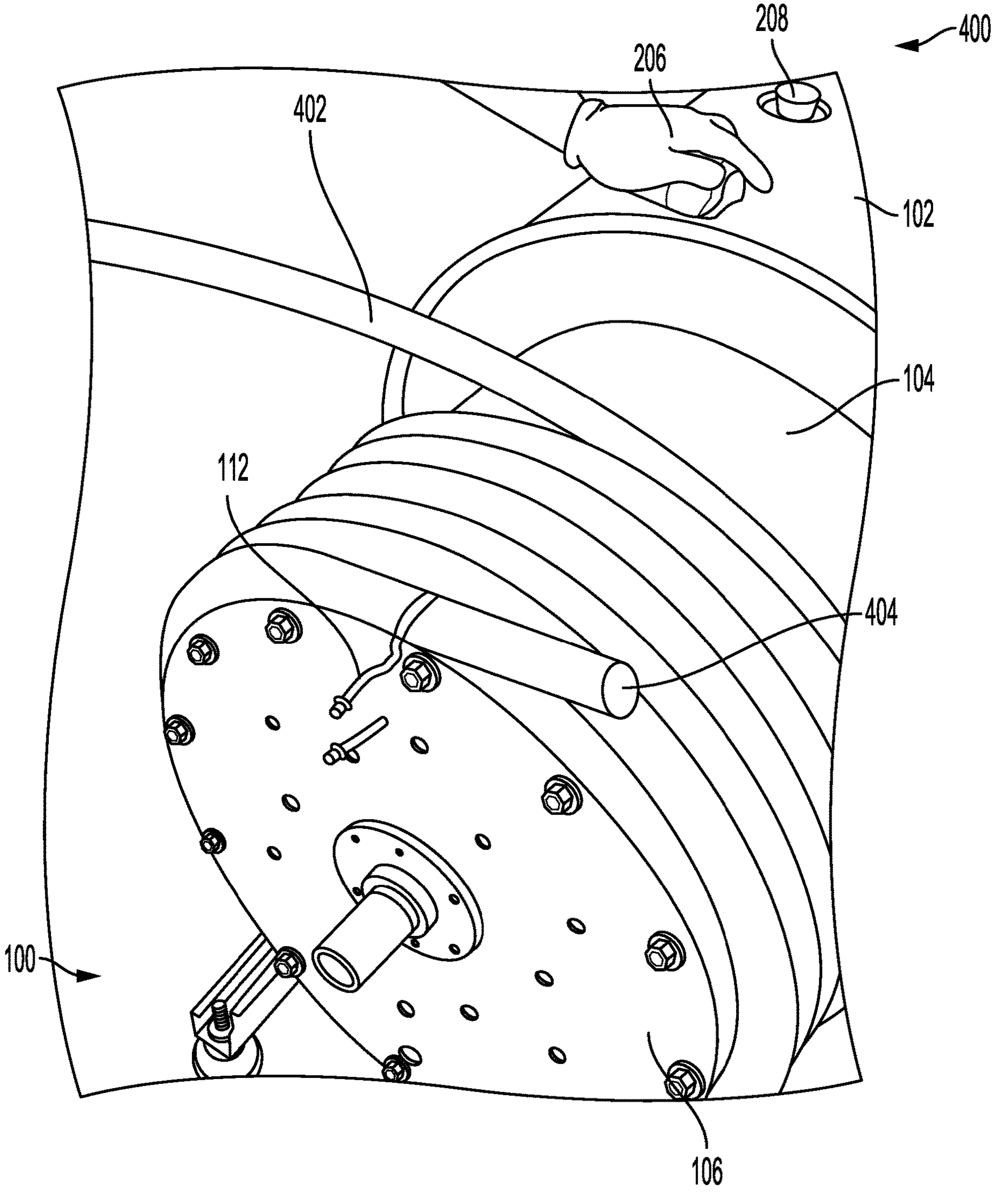
FIG. 5 illustrates a spooler system including a woundable material partially wound on a spooler, in accordance with one embodiment of the present disclosure.

FIG. 5 illustrates a spooler system including a woundable material partially wound on a spooler. The description of the spooler 100 and spooler system 400 with respect to FIGS. 1A-4 is applicable to the description of FIG. 5 and similar numbered components have similar form and function unless otherwise noted herein. Spooler system 400 includes a woundable material 402 wound on the spooler 100. As shown in FIG. 5, the woundable material 402 is in the process of being wound onto the barrel 104 of the spooler 100. In particular, a first end 404 of the woundable material 402 is secured to the barrel 104 using a first retention mechanism 112 at the first end 106 of the barrel 104 as described in detail above.

Various components of the spooler 100 are removed in this view for clarity as would be appreciated by one having ordinary skill in the art upon reading the present disclosure. For example, as shown in FIG. 5, an operator is guiding the woundable material 402 along the barrel 104 as the woundable material 402 is wound. In other embodiments, such as that shown in FIG. 1A, a guiding element 114 may be used to distribute the woundable material 402 along the barrel 104 and/or an alternative guiding element 115 may be used to retain the woundable material 402 as it is wound or unwound on the barrel 104. As further shown in FIG. 5, an operator may operate the speed regulation mechanism 206 to start, stop, slow down, speed up, and change direction of the rotation of the spooler 100. Furthermore, the emergency stop mechanism 208 is located on the housing 102 for easy access to stop the rotation of the barrel 104 of the spooler 100.

Figure 6:
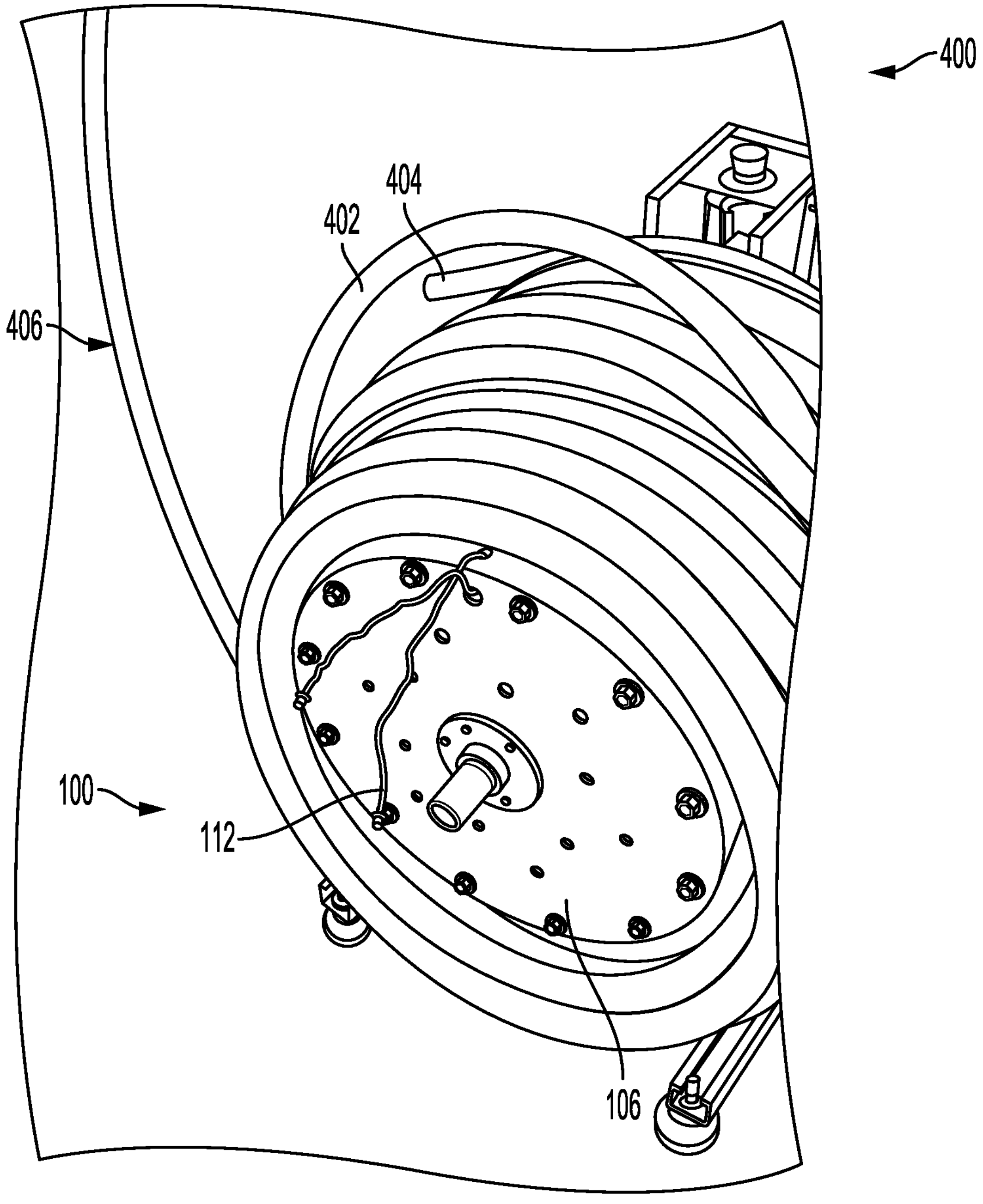
FIG. 6 illustrates a spooler system including a woundable material wound on a spooler, in accordance with one embodiment of the present disclosure.

FIG. 6 illustrates a spooler system including a woundable material wound on a spooler. The description of the spooler 100 and spooler system 400 with respect to FIGS. 1A-5 is applicable to the description of FIG. 6 and similar numbered components have similar form and function unless otherwise noted herein. Spooler system 400 includes a woundable material 402 wound on the spooler 100. As shown in FIG. 6, a length of the woundable material 402 is wound onto the barrel 104 of the spooler 100.

As shown in FIG. 6 a first end 404 of the woundable material 402 has been unsecured from the barrel 104 and the first retention mechanism 112 at the first end 106 of the barrel 104 and the free first end 404 of the woundable material 402 has sprung to another location relative to the spooler 100. Accordingly, FIG. 6 illustrates the relative stiffness of the coaxial cable and emphasizes the use the of the first retention mechanism 112 for woundable materials having similar stiffness, etc. One having ordinary skill in the art would appreciate that not all woundable materials would require the use of a retention mechanism such as first retention mechanism 112. For example, a soft rope or the like may be capable of being wound without securing a first end.

According to various embodiments, the woundable material 402 may be spooled on the spooler 100 from a bulk reel, such as reel 401 shown in FIG. 4, and a length of woundable material 402 may be predetermined by a user or the like. Accordingly, once the predetermined length of the woundable material 402 is wound onto the spooler 100, the woundable material 402 may be cut to form a distal end 406 of the length of the woundable material 402. Accordingly, the function of the spooler 100 may be twofold in this embodiment. The spooler 100 may be used to measure the length of the woundable material 402 and to spool the length of the woundable material 402 for transport and use. In some embodiments, the spooler 100 may include a mechanism for measuring the length of the woundable material 402 spooled on the spooler that may include optics, a gyroscope, a counter, or the like, or a combination thereof for verifying the length of the woundable material 402 that is wound on the spooler 100.

Various components of the spooler 100 are removed in this view for clarity as would be appreciated by one having ordinary skill in the art upon reading the present disclosure. For example, as shown in other figures, a guiding element 114 may be used to distribute the woundable material 402 along the barrel 104 and/or an alternative guiding element 115 may be used to retain the woundable material 402 as it is wound or unwound on the barrel 104.

Figure 7:
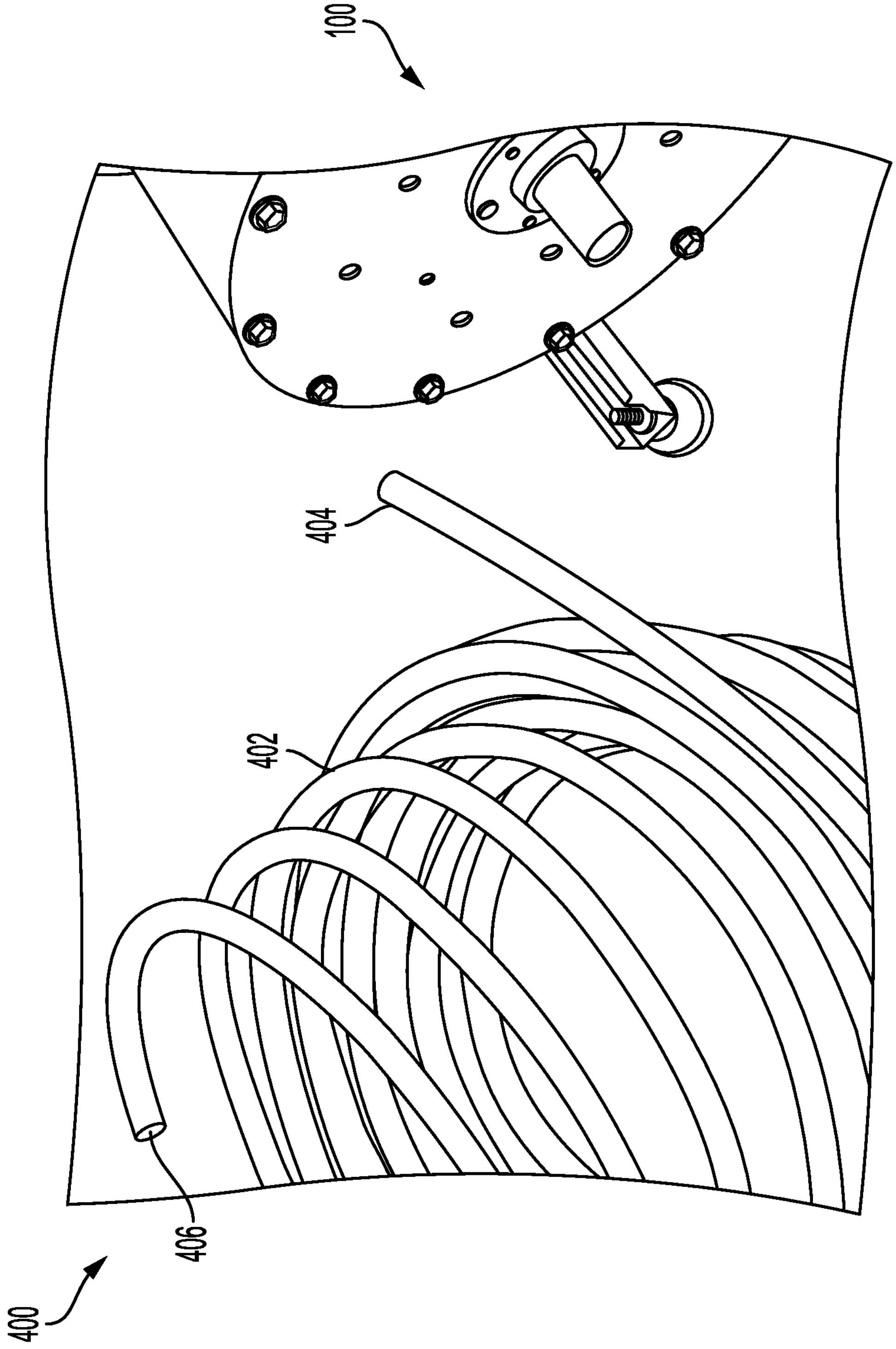
FIG. 7 illustrates a spooler system including a woundable material that was wound on a spooler and removed from the spooler, in accordance with one embodiment of the present disclosure.

FIG. 7 illustrates a spooler system including a woundable material that was wound on a spooler and removed from the spooler. The description of the spooler 100 and spooler system 400 with respect to FIGS. 1A-6 is applicable to the description of FIG. 7 and similar numbered components have similar form and function unless otherwise noted herein. Spooler system 400 includes a woundable material 402 wound on the spooler 100. As shown in FIG. 7, a length of the woundable material 402 has been wound onto the barrel 104 of the spooler 100 and removed from the spooler 100.

According to various embodiments, the woundable material 402 may be spooled on the spooler 100 from a bulk reel, such as reel 401 shown in FIG. 4, and a length of woundable material 402 may be predetermined by a user or the like. Accordingly, the distal end 406 of the length of the woundable material 402 is formed and the coil of woundable material 402 may be removed. The length of the woundable material 402 is coiled for transportation and use. For example, in this state, the woundable material 402 may be further secured in the coil shape with a strap or the like. The coil of woundable material 402 may be loaded onto a vehicle or otherwise stored as a predetermined length of pre-spooled woundable material 402 ready for installation. In an exemplary application, a plurality of coils of woundable material 402 are transported with a temporary cell tower and each coil of woundable material 402 is installed with the temporary cell tower. When the temporary cell tower is disassembled, a spooler 100 which may be mounted to a vehicle or otherwise transported with the temporary cell tower, may be used to wind the woundable material 402 (e.g., the coaxial cables) for transportation and reuse at another site, etc.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A spooler, comprising:
an engine within a housing;
an arm extending from the housing and rotated via the engine;
a barrel supported by the arm such that the barrel rotates with the arm, the barrel having a first end and a second end facing the housing, wherein the second end is a separate piece that is removably coupled to the barrel, wherein the barrel and the arm are configured for rotating a first direction for winding and a second direction for unwinding, wherein the barrel is removable from the housing for transport and replacement of a woundable material wounded on the barrel;
a first retention mechanism disposed along a perimeter of the barrel, wherein the first retention mechanism removably secures a first end of the woundable material to a perimeter of a first end of the barrel as the barrel is rotated;
a removable guiding element extending from the second end of the barrel for maintaining the woundable material relative to the barrel and distributing the woundable material along the barrel as the woundable material is wound around the barrel during rotation, wherein the removable guiding element is a movable clamp feature that is actuatable by an operator to transition between a first configuration and a second configuration, wherein the removable guiding element maintains the woundable material on the barrel in the first configuration and enables removal of the woundable material from the barrel in the second configuration, wherein the woundable material is coaxial cable.

2. The spooler of claim 1, further comprising a second retention mechanism disposed along the perimeter of the barrel.

3. The spooler of claim 2, wherein the second retention mechanism secures a second end of the woundable material to the barrel.

4. The spooler of claim 1, further comprising a mounting mechanism for mounting the spooler to a vehicle.

5. The spooler of claim 1, further comprising a speed regulation mechanism for adjusting a rate of the rotation.

6. The spooler of claim 1, wherein the engine is battery operated.

7. The spooler of claim 1, further comprising a mechanism for measuring a length of the woundable material comprising at least one of an optic device, a gyroscope, and a counter.

8. A spooler system, comprising:
a woundable material having a first end and a second end; and
a spooler, the spooler comprising:
an enclosed housing;
a battery operated engine within housing and accessible via a removable top cover;
a speed regulation mechanism extending from within the housing through the removable top cover for adjusting a rate of rotation;
an arm extending from the housing and rotated via the engine;
a barrel supported by the arm such that the barrel rotates with the arm, wherein the barrel and the arm are configured for rotating a first direction for winding and a second direction for unwinding, wherein a first circumference of a first end of the barrel is different from a second circumference of a second end of the barrel;
a first retention mechanism that removably secures the first end of a woundable material to the barrel;
a first guiding element comprising a movable clamp feature that is actuatable between a first configuration and a second configuration for maintaining the woundable material relative to the barrel and distributing the woundable material along the barrel as the woundable material is wound around the barrel during rotation and being actuatable between the first configuration and the second configuration, wherein the first guiding element retains the woundable material on the barrel in the first configuration, wherein the woundable material is removable from the barrel when the first guiding element is in the second configuration; and
a mounting mechanism for removably mounting the spooler to a vehicle.

9. The spooler of claim 8, further comprising an emergency stop mechanism.

10. The spooler of claim 8, wherein the woundable material is coaxial cable.

11. The spooler of claim 8, further comprising a second guiding element removably disposed on an end of the barrel closest to the housing for maintaining the woundable material around the barrel.

12. The spooler of claim 11, wherein the guiding element is removable from the barrel.

13. The spooler of claim 8, wherein the first retention mechanism removably secures a first end of a woundable material to a perimeter of a first end of the barrel as the barrel is rotated.

* * * * *